United States Patent
Boursier et al.

(10) Patent No.: US 7,960,674 B2
(45) Date of Patent: Jun. 14, 2011

(54) AEROSPACE ARTICLES MADE FROM QUASI-ISOTROPIC CHOPPED PREPREG

(75) Inventors: Bruno S. Boursier, Dublin, CA (US); Jack D. Fudge, San Ramon, CA (US)

(73) Assignee: Hexcel Corporation, Dublin, CA (US)

( * ) Notice: Subject to any disclaimer, the term of this patent is extended or adjusted under 35 U.S.C. 154(b) by 979 days.

(21) Appl. No.: 11/476,965

(22) Filed: Jun. 27, 2006

(65) Prior Publication Data
US 2011/0011975 A1 Jan. 20, 2011

Related U.S. Application Data

(60) Provisional application No. 60/694,593, filed on Jun. 28, 2005.

(51) Int. Cl.
*H05B 6/10* (2006.01)
*B32B 3/02* (2006.01)
(52) U.S. Cl. .......................................... 219/633; 428/81
(58) Field of Classification Search .......... 219/603–633; 428/81–300.7
See application file for complete search history.

(56) References Cited

U.S. PATENT DOCUMENTS

| | | | | |
|---|---|---|---|---|
| 5,962,348 A | * | 10/1999 | Bootle et al. | 442/265 |
| 6,323,468 B1 | * | 11/2001 | Dabelstein et al. | 219/617 |
| 6,436,507 B1 | * | 8/2002 | Pannell | 428/102 |
| 6,602,810 B1 | * | 8/2003 | Christensen et al. | 442/232 |
| 6,632,502 B1 | * | 10/2003 | Allen et al. | 428/119 |
| 6,924,021 B1 | * | 8/2005 | Colegrove et al. | 428/81 |
| 7,126,096 B1 | * | 10/2006 | Matsen et al. | 219/633 |

FOREIGN PATENT DOCUMENTS

| | | |
|---|---|---|
| EP | 1134314 B1 | 9/2004 |
| EP | 0916477 B1 | 12/2004 |

\* cited by examiner

*Primary Examiner* — Daniel Robinson
(74) *Attorney, Agent, or Firm* — W. Mark Bielawski; David J. Oldenkamp

(57) ABSTRACT

Quasi-isotropic chopped prepreg is used to make parts found in aerospace vehicles. Exemplary aerospace parts that are made using quasi-isotropic chopped prepreg include aircraft window frames, wing fairing supports, flange supports, frame gussets, rudder actuator brackets, shear ties, seat pedestals, cargo floor flange supports, storage bin fittings, antenna supports, torque tube pans, handle boxes, side guide fittings, wing box covers and intercostals.

8 Claims, 2 Drawing Sheets

AEROSPACE ARTICLES MADE FROM QUASI-ISOTROPIC CHOPPED PREPREG

BACKGROUND OF THE INVENTION

1. Field of the Invention

The present invention relates to composite materials and processes for their use in the aerospace industry. More particularly, the invention is directed to quasi-isotropic chopped prepreg and the use of such composite material for the production of structural parts and other components having complex geometries that are designed for use in aircraft and other aerospace vehicles.

2. Description of Related Art

Lightweight metals, such as aluminum and magnesium alloys, have long been used as standard materials to make a wide variety of parts that are used in aircraft and other aerospace vehicles. Stronger and heavier metals, such as steel and titanium alloys, are also commonly used in place of aluminum to make aerospace components where there is a particular need for structural strength, fatigue resistance and/or galvanic corrosion protection.

Composite materials have become a popular replacement for many aerospace metal parts because composites are much lighter. However, there are a number of complex engineering issues that must be considered when replacing a metal part with a composite material. The performance of the composite part under a number of different stress loads must be carefully analyzed and compared to the metal part being replaced. Typical mechanical properties that are measured include compression strength, compression modulus, tensile strength, tensile modulus, flexure strength, flexure modulus and short beam shear. Standardized tests for measuring these various mechanical properties are described in ASTM D6272, ASTM D3039, ASTM D695 and ASTM D2344.

The flaw sensitivity properties of the composite part must also be carefully analyzed and compared to the metal part that is being replaced. This is especially important with respect to composite parts that include holes for attaching the part to aircraft structures. Such parts include window frames, wing fairing supports, flange supports, frame gussets, rudder actuator brackets, shear ties, seat pedestals, cargo floor flange supports, storage bin fittings, antenna supports, intercostals and other aerospace parts that form bolted or riveted joints in the vehicle structure. The holes form voids in the composite that are considered to be flaws. Exemplary flaw properties that must be analyzed include un-notched compression, open hole compression, bearing (ASTM 5961) and compression-after-impact.

Prepreg is used widely in the manufacture of composite parts. Prepreg is a combination of an uncured resin (matrix) and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network have a large affect on the structural properties of the part. Prepreg is a preferred material for use in manufacturing aerospace composite parts, since it is important that each composite part meet specific design tolerances that have been established for the part.

The fiber reinforcements that are commonly used in aerospace prepreg are multidirectional woven fabrics or a unidirectional tape that contains fibers extending parallel to each other. The fibers can also be chopped and randomly oriented in the resin to form a non-woven mat. These various fiber reinforcement configurations are impregnated with a carefully controlled amount of uncured resin. The resulting prepreg is placed between protective layers and rolled up for storage or transport to the manufacturing facility.

Prepreg may also be in the form of short segments of chopped unidirectional tape that are randomly oriented to form a non-woven mat of chopped unidirectional tape. This type of pre-preg is referred to as a "quasi-isotropic chopped" prepreg. Quasi-isotropic chopped prepreg is similar to the more traditional non-woven fiber prepreg, except that short lengths of chopped unidirectional tape (chips) are randomly oriented in the mat rather than chopped fibers. Quasi-isotropic chopped prepreg is considered to be "transversely isotropic". The random orientation of the unidirectional chips provides isotropic properties in the plane of the mat. The quasi-isotropic chopped prepreg is therefore a transverse isotropic material. Properties are the same in any direction within the plane of the mat. Outside the plane of the mat (z direction), the properties are, however, different.

Quasi-isotropic chopped prepreg has been available commercially from Hexcel Corporation (Dublin, Calif.) under the tradename HexMC®. Quasi-isotropic chopped prepreg has been used in the past for a variety of purposes including bicycle parts and various other molded parts. However, quasi-isotropic chopped prepreg materials have not been used in the manufacture of aerospace parts. This is especially true for aerospace parts, such as aircraft window frames, that are bolted or riveted to the aerospace structure and a multitude of gussets, brackets and connectors, such as cargo floor flange supports, that form bolted or riveted joints in the vehicle structure.

SUMMARY OF THE INVENTION

In accordance with the present invention, it was discovered that quasi-isotropic prepreg may be used to form aerospace parts and particularly composite parts that are bolted or riveted in place or connectors that are used to join at least two other aerospace parts together. The quasi-isotropic prepreg may be molded into a wide variety of composite shapes varying from simple flanges and gussets to complex fittings and actuators. The quasi-isotropic prepreg may be molded or machined to form holes in the composite connector that allow attachment of the aerospace parts using bolts, rivets and the like. The invention is particularly applicable to aircraft window frames that include numerous holes for attachment to the aircraft fuselage.

The present invention is directed to aerospace assemblies that include a first aerospace part and a second aerospace part that are joined together with a connector that is made using quasi-isotropic chopped prepreg. The invention is also directed to aerospace assemblies in which a part made from quasi-isotropic chopped prepreg is attached to at least one other aerospace part. The present invention also covers airplanes and other aerospace vehicles that contain such assemblies. The invention also is directed to methods for joining aerospace part together using composite connectors made using quasi-isotropic chopped prepreg. The invention also covers methods for making aerospace parts using quasi-isotropic chopped prepreg.

The above described and many other features and attendant advantages of the present invention will become better understood by reference to the following detailed description when taken in conjunction with the accompanying drawings.

DETAILED DESCRIPTION OF THE INVENTION

Figure 1:
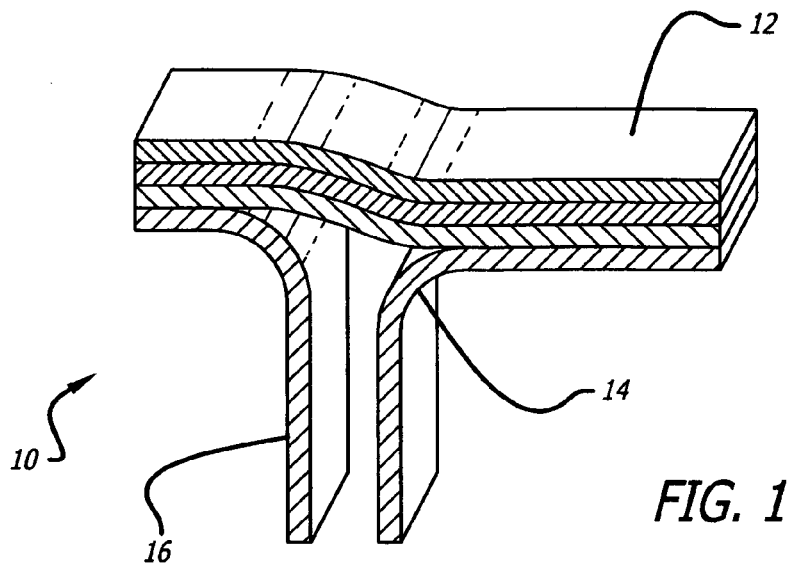
FIG. 1 is a simplified view of an exemplary aerospace T-stiffener made using quasi-isotropic chopped prepreg in accordance with the present invention.

The present invention involves the use of quasi-isotropic chopped prepreg to make parts that are used in airplanes, helicopters and other aerospace vehicles. Such parts are referred to as "aerospace parts" and when used in combination with other parts of the aerospace vehicle, they are referred to as "aerospace assemblies". For the purposes of this specification, "quasi-isotropic chopped prepreg" means prepreg that is provided as a mat made up of randomly oriented "chips" of chopped unidirectional tape. The size of the chips may be varied depending upon the particular aerospace part being made. It is preferred that the chips be ⅓ inch wide, 2 inches long and 0.006 inch thick. The chips include unidirectional fibers that can be carbon, glass, aramid, polyethylene or any of the fibers types that are commonly used in the aerospace industry. Carbon fibers are preferred. The chips are randomly oriented in the mat and they lay relatively flat. This provides the mat with its transverse isotropic properties.

The chips also include a resin matrix that can be any of the resins commonly used in aerospace prepregs including epoxy, phenolic, bismaleimide and cyanates. Epoxy resins are preferred. The resin content of the chips may also be varied depending upon structural or other requirements of the aerospace part being made. The amount of resin is selected based on known parameters for resin content that have been established for aerospace prepregs. Chips with resin contents of about 38 weight percent are preferred. No additional resin is typically added to the prepreg chips when forming the quasi-isotropic chopped prepreg. The resin present in the initial prepreg is sufficient to bond the chips together to form the mat.

The quasi-isotropic chopped prepreg can be made by purchasing or making unidirectional prepreg tape of desired width. The tape is then chopped into chips of desired length and the chips are laid flat and pressed together to form a mat of randomly oriented chips. The chips inherently bond together due to the presence of the prepreg resin. The preferred method, however, is to purchase the quasi-isotropic chopped prepreg from a commercial source, such as Hexcel Corporation. Hexcel Corporation provides quasi-isotropic chopped prepreg material under the tradename HexMC®. A variety of HexMC® quasi-isotropic chopped prepregs are available that are made from unidirectional prepreg tapes that are available under the tradename HexPly®.

An exemplary preferred quasi-isotropic chopped prepreg material is HexMC® 8552/AS4. This quasi-isotropic chopped prepreg material is supplied as a continuous roll of a mat that is 18 inches wide and 0.08 inch thick. HexPly® 8552/AS4 unidirectional fiber prepreg is used to make the chips that are randomly oriented in the quasi-isotropic mat. HexPly® 8552/AS4 prepreg is a carbon fiber/epoxy unidirectional tape that is 0.0065 inch thick and has a fiber areal weight of about 145 grams/square meter. The resin content of the tape is 38 weight percent. The tape is slit to provide ⅓-inch strips and chopped to provide chips that are 2 inches long. The chip density is about 1.52 gram/cubic centimeter. Other exemplary quasi-isotropic chopped prepreg can be made using other HexPly® unidirectional prepreg tape such as EMC 116/AS4 (carbon fiber/epoxy), 8552/IM7 (carbon fiber/epoxy), 3501-6/T650 (carbon fiber/epoxy) and M21/IM7 (carbon fiber/epoxy). HexMC® 8552/AS4 is a preferred quasi-isotropic chopped prepreg for use in making aerospace parts and assemblies in accordance with the present invention.

For structural aerospace applications, the quasi-isotropic chopped prepreg may be molded using traditional prepreg layup and preform fabrication techniques. Generally, the charge is made to fit within ⅛ to ½ inch of the part edge. The lay-up will flow to fill out the part edges and to produce geometrical features. Other features may require more precise placement of the quasi-isotropic chopped prepreg. By fitting the quasi-isotropic chopped prepreg relatively closely to the part edge, "near net" patterns are provided, which is a distinguishable feature not associated with traditional molding compounds.

It is preferred that the molding process be a "low flow" process. A low flow process is defined as molding the quasi-isotropic chopped prepreg with a minimum disturbance of the chips orientation, therefore preserving the transverse isotropic characteristic of the material. This is accomplished by keeping the flow of resin during the molding process at a level that does not re-orient or otherwise unduly disturb the alignment of the chips and their unidirectional fibers.

Tests conducted on finished parts have shown that low flow processing that maintains the straightened fibers in a strip, outperform high flow processing. This performance improvement is due to the retention of the straightened fibers in the prepreg chips. High flow molding destroys the chips by separating the fibers. The fibers get bent and crimped producing a more homogeneous looking product. However, the bent and crimped fibers produce a product that does not perform as well as the product produced using low flow processing where the chips remain well defined.

It is preferred that the quasi-isotropic chopped prepreg be molded using a staging process that enables it to be molded at isothermal conditions. Un-staged alternatives are available with ramped press cycles or autoclave molding. Staging is an open-air oven process that generally transforms the quasi-isotropic chopped prepreg from a flexible material to a stiff solid state. Staging for 10 to 20 minutes at 320° F. to 350° F. is preferred. Staging times and temperatures are dependent on the final charge thickness, the amount of flow desired, the amount of loading time desired and the final cure temperature. Once staged the material is allowed to cool and can be stored in a freezer for later processing.

Final cure time is a function of the isothermal cure temperature and can be as little as 10 minutes for 8552/AS4 that is ⅛ inch thick or less. As a general rule, 5 minutes of cure time is added for every 0.060 inch increase in thickness with the minimum time being set for curing a ⅛ inch part (10 minutes at 400° F.). Lower isothermal cure temperatures may be used to facilitate part loading or to allow more time to equalize the charge temperature in thick parts before pressing. If staging is not desired, it is possible to lay up in the mold and perform a traditional ramp and dwell cure on the part. However, staging is preferred in order to limit flow of resin during the molding process.

Exemplary process temperatures for quasi-isotropic chopped prepreg using 8552 epoxy resin are staging for 10 minutes at 350° F. followed by curing for 10 minutes at 400° F. The part is post cured for 2 hours at 350° F. Exemplary processing temperatures for quasi-isotropic chopped prepreg using M21 epoxy resin are staging for 20 minutes at 320° F. followed by curing for 45 minutes at 365° F. The part is also post cured for 2 hours at 350° F.

The quasi-isotropic chopped prepreg is molded at pressures in the range of 750-2000 psi using matched metal molds with shear edges (0.015 inch or less). The isothermal mold temperature may range from 350° F. to 400° F. with cure times ranging for 10 to 45 minutes. High pressure molding is typically useful for making parts with complex shapes.

Molding using conventional vacuum bagging techniques is also suitable. For example, the quasi-isotropic chopped prepreg may be envelope bagged and subjected to a traditional autoclave cycle using 100 psi and full vacuum and ramping the temperature at 3° F. per minute to 350° F. and then post curing the part at 350° F. for 2 hours.

In addition to molding considerations, one should also consider methods of de-molding the part once molding is complete. De-molding of the part along with low resin strength during de-molding can affect the final part quality. Aerospace parts were made using quasi-isotropic chopped prepreg and demolded at over 100° F. above the glass transition temperature for the part.

The quasi-isotropic chopped prepreg may be used to make a wide variety aerospace parts that have been traditionally made using aluminum, steel, titanium and their alloys. Exemplary aerospace parts include aircraft window frames, wing fairing supports, flange supports, frame gussets, rudder actuator brackets, shear ties, seat pedestals, cargo floor flange supports, storage bin fittings, antenna supports, torque tube pans, handle boxes, side guide fittings, wing box covers and intercostals. Quasi-isotropic chopped prepreg is preferred for bending, riveted or bolted joints and where damage tolerance is a requirement. Using quasi-isotropic chopped prepreg to make composite connectors for joining aerospace parts together with bolts or rivets is preferred because open holes in the composite connector cause very little change in the performance response of the connector. It was found that the presence of a 0.25-inch hole in aerospace parts made using quasi-isotropic chopped prepreg had a negligible effect on the strength of the part. This is different from conventional prepreg where such a hole drives failure of the part. In addition, aerospace parts made using quasi-isotropic chopped prepreg showed strength that is independent of loading direction when the part is loaded in the plane of the part. This is different from conventional prepreg, which produces parts that show a 15% reduction in strength when the part is loaded in an off angle direction of 22.5 degrees.

An exemplary aerospace part in accordance with the present invention is shown as T-stiffener 10 in FIG. 1. The T-stiffener is made up of horizontally oriented quasi-isotropic chopped prepreg mat layers 12 that form the flange portion of the stiffener and L-shaped layers of quasi-isotropic chopped prepreg mat 14 that extend from the flange portion of the stiffener to the rib portion, which is shown at 16. The T-stiffener 10 may include holes (not shown) for attaching the T-stiffener to the flange and rib surfaces via bolts or rivets to provide stiffening of the flange-rib assembly. It is preferred in aerospace parts, such as T-stiffener 10 where the flange and rib portions of the part are not in planar alignment, that continuous pieces of quasi-isotropic chopped prepreg mat 14 be bent or otherwise formed to follow the non-planar alignment.

Figure 2:
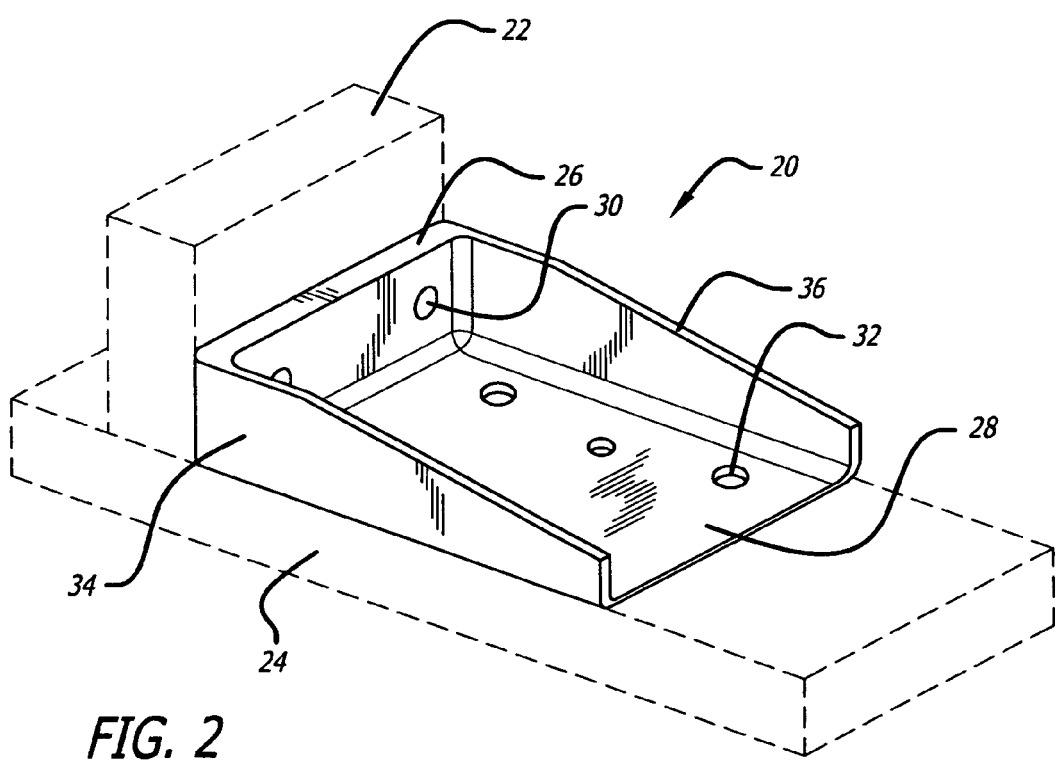
FIG. 2 is an exemplary aerospace cargo floor flange support made using quasi-isotropic chopped prepreg in accordance with the present invention.

Another exemplary aerospace part in accordance with the present invention is a cargo floor flange support as shown at 20 in FIG. 2. The cargo flange support 20 is used to connect the cargo floor represented in phantom at 22 to the aircraft fuselage represented in phantom at 24. The cargo flange support 20 includes a first flange portion 26 and second flange portion 28, both of which include holes (30 and 32, respectively) for attachment to the aircraft. The cargo floor flange support 20 also includes reinforcing ribs 34 and 36, which provide needed stiffness and structural strength to the part. The cargo flange support 20 is capable of carrying a load of over 6000 pounds through the two holes 30. The load is transferred to the fuselage attaching structure through holes 32. It is preferred that the cargo floor flange support 20 be made using continuous mats of quasi-isotropic chopped prepreg that are formed to follow the non-planar alignment of the various portions of the flange support.

Figure 3:
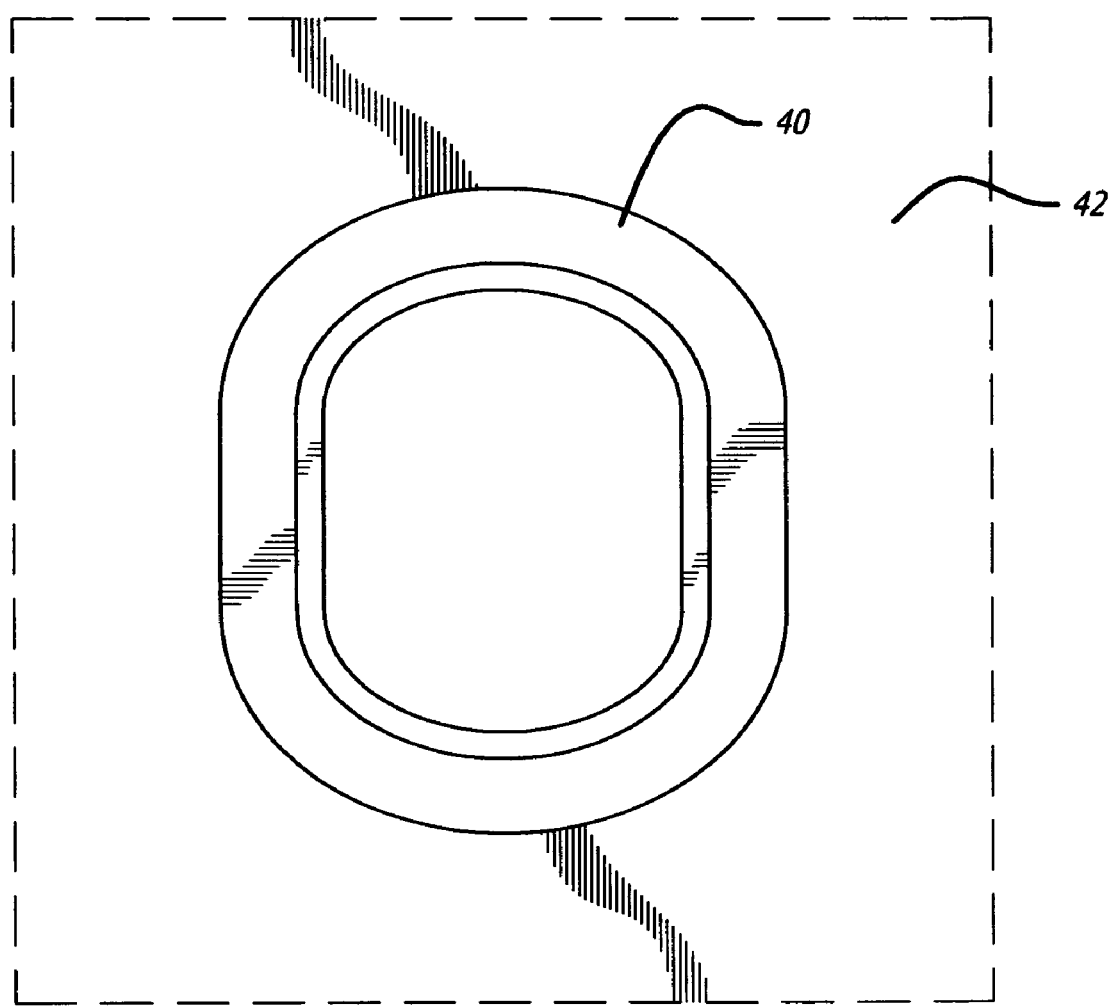
FIG. 3 is an exemplary aircraft window frame made using quasi-isotropic chopped prepreg in accordance with the present invention.

An aircraft window frame made using quasi-isotropic chopped prepreg in accordance with the present invention is shown at 40 in FIG. 3. The window frame 40 includes numerous holes (not shown) for attaching the frame to the aircraft fuselage, which is represented in phantom at 42. Quasi-isotropic chopped prepreg is well suited for use in making aircraft window frames because the strength of the frame is minimally affected by the numerous holes that must be made in the material to attach the frame to the fuselage.

Having thus described exemplary embodiments of the present invention, it should be noted by those skilled in the art that the within disclosures are exemplary only and that various other alternatives, adaptations and modifications may be made within the scope of the present invention. For example, quasi-isotropic chopped prepreg may be combined with unidirectional tape and/or fabric prepreg having the same resin matrix and molded concurrently to form aerospace parts. Accordingly, the present invention is not limited by the above-described embodiments, but is only limited by the following claims.

What is claimed is:

1. An assembly comprising:
a first aircraft part;
a second aircraft part; and
a third aircraft part for joining said first and second aircraft parts together wherein said third aircraft part comprises a cured quasi-isotropic chopped prepreg and wherein said third aircraft part comprises a first portion for attachment to said first aircraft part and a second portion for attachment to said second aircraft part wherein at least one of said first or second portions comprises a surface defining a hole through said first or second portion.

2. An assembly according to claim 1 wherein said cured quasi-isotropic chopped prepreg comprises a resin selected from the group consisting of epoxy, phenolic, bismaleimide and cyanates.

3. An assembly according to claim 1 wherein said cured quasi-isotropic chopped prepreg comprises fibers selected from the group consisting of carbon, glass, aramid and polyethylene.

4. An assembly according to claim 1 wherein said cured quasi-isotropic chopped prepreg comprises epoxy resin and carbon fibers.

5. An assembly according to claim 1 wherein said third aircraft part comprises a first portion for attachment to said first aircraft part and a second portion for attachment to said second aircraft part wherein said first and second portions are not in planar alignment.

6. An assembly according to claim 1 wherein said third aircraft part is selected from the group consisting of wing fairing supports, flange supports, frame gussets, rudder actuator brackets, shear ties, seat pedestals, cargo floor flange supports, storage bin fittings, antenna supports and intercostals.

7. An assembly comprising a first aircraft part;

a second aircraft part; and a third aircraft part for joining said first and second aircraft parts together wherein said third aircraft part comprises a cured quasi-isotropic chopped prepreg and wherein said third aircraft part is a cargo flange support and wherein said first aircraft part is a cargo floor and said second aircraft part is an aircraft fuselage.

8. An assembly according to claim 7 wherein said cargo flange support is capable of carrying a load of over 6000 pounds.

* * * * *